United States Patent
Gibson et al.

(10) Patent No.: US 10,804,834 B2
(45) Date of Patent: Oct. 13, 2020

(54) METHOD FOR SELECTING A FREQUENCY CONVERTER FOR A REFRIGERANT COMPRESSOR UNIT

(71) Applicant: Bitzer Kuehlmaschinenbau GmbH, Sindelfingen (DE)

(72) Inventors: John Gibson, Fuerth (DE); Tobias Hieble, Gaertringen (DE); Julian Pfaffl, Tuebingen (DE); Juergen Nill, Moessingen (DE); Ferdinand Breithuth, Tuebingen (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 0 days.

(21) Appl. No.: 16/168,108

(22) Filed: Oct. 23, 2018

(65) Prior Publication Data

US 2019/0058433 A1 Feb. 21, 2019

Related U.S. Application Data

(63) Continuation of application No. PCT/EP2016/059168, filed on Apr. 25, 2016.

(51) Int. Cl.
| | |
|---|---|
| *H02P 27/04* | (2016.01) |
| *H02P 23/00* | (2016.01) |
| *H02P 29/032* | (2016.01) |
| *F25B 49/02* | (2006.01) |
| *H02P 27/06* | (2006.01) |
| *H02P 29/02* | (2016.01) |

(Continued)

(52) U.S. Cl.
CPC .......... *H02P 27/047* (2013.01); *F25B 49/025* (2013.01); *H02P 23/00* (2013.01);
(Continued)

(58) Field of Classification Search
CPC ............................... H02P 27/047; H02P 29/02
(Continued)

(56) References Cited

U.S. PATENT DOCUMENTS

| 5,446,354 A | * | 8/1995 | Hiruma | ................ | G01R 31/34 318/400.21 |
|---|---|---|---|---|---|
| 5,796,237 A | | 8/1998 | Yamakawa | | |

(Continued)

FOREIGN PATENT DOCUMENTS

| EP | 1 624 562 A1 | 2/2006 |
|---|---|---|
| WO | WO 2010/043318 A1 | 4/2010 |

OTHER PUBLICATIONS

ASERCOM: "Guide-Book , Empfehlungen Zum Betrieb Von Frequenzumrichtern Ankälteverdichtern, Die Nach Dem Verdrängerprinzip Arbeiten" Apr. 2012 (Apr. 1, 2012), 16 pages.

(Continued)

*Primary Examiner* — David Luo
(74) *Attorney, Agent, or Firm* — Reinhart Boerner Van Deuren P.C.

(57) ABSTRACT

In order to improve a method for selecting a frequency converter for a refrigerant compressor unit that includes a refrigerant compressor and an electric drive motor such that the frequency converter is selected in a manner for optimized use, it is proposed that a working state suitable for operation of the refrigerant compressor unit should be selected within an application field of an application graph of the refrigerant compressor, that an operating frequency for this selected working state should be selected, and that a working state operating current value that corresponds to the selected working state and the selected operating frequency should be determined from drive data, for operation of the refrigerant compressor unit.

26 Claims, 12 Drawing Sheets

(52) U.S. Cl.
CPC .............. *H02P 27/06* (2013.01); *H02P 29/02* (2013.01); *H02P 29/032* (2016.02); *F25B 2500/26* (2013.01); *F25B 2600/021* (2013.01); *H02P 2201/01* (2013.01); *Y02B 30/741* (2013.01)

(58) Field of Classification Search
USPC ...................................................... 318/3, 34
See application file for complete search history.

(56) References Cited

U.S. PATENT DOCUMENTS

| 7,164,242 B2 * | 1/2007 | Federman | ............. | F25B 49/025 |
| | | | | 318/400.21 |
| 8,650,894 B2 * | 2/2014 | Tolbert, Jr. | ............. | F25B 49/025 |
| | | | | 62/228.1 |
| 2005/0068001 A1 | 3/2005 | Skaug et al. | | |
| 2011/0074317 A1 | 3/2011 | Gibson et al. | | |

OTHER PUBLICATIONS

Dr. John P. Gibson: http://www.frigokimo.com/fk/site/publication/DKIt+Kklmtchnk_13c.2.pdf; Jun. 2013 (Jun. 1, 2013), 4 pages.

Dr. John P. Gibson: "Frequenzumrichter and ihreWirkung auf Kalteverdichter", May 2012 (May 5, 2012), 27 pages.

Jun. 2014: "GEA Refrigeration Technologies GEA Bock Software VAP 11 (Online) Neues in dieser Version 1 GEA Bock Software VAP 11 (Online)—Neues in dieser Version", Jun. 2014 (Jun. 1, 2014), 16 pages.

* cited by examiner

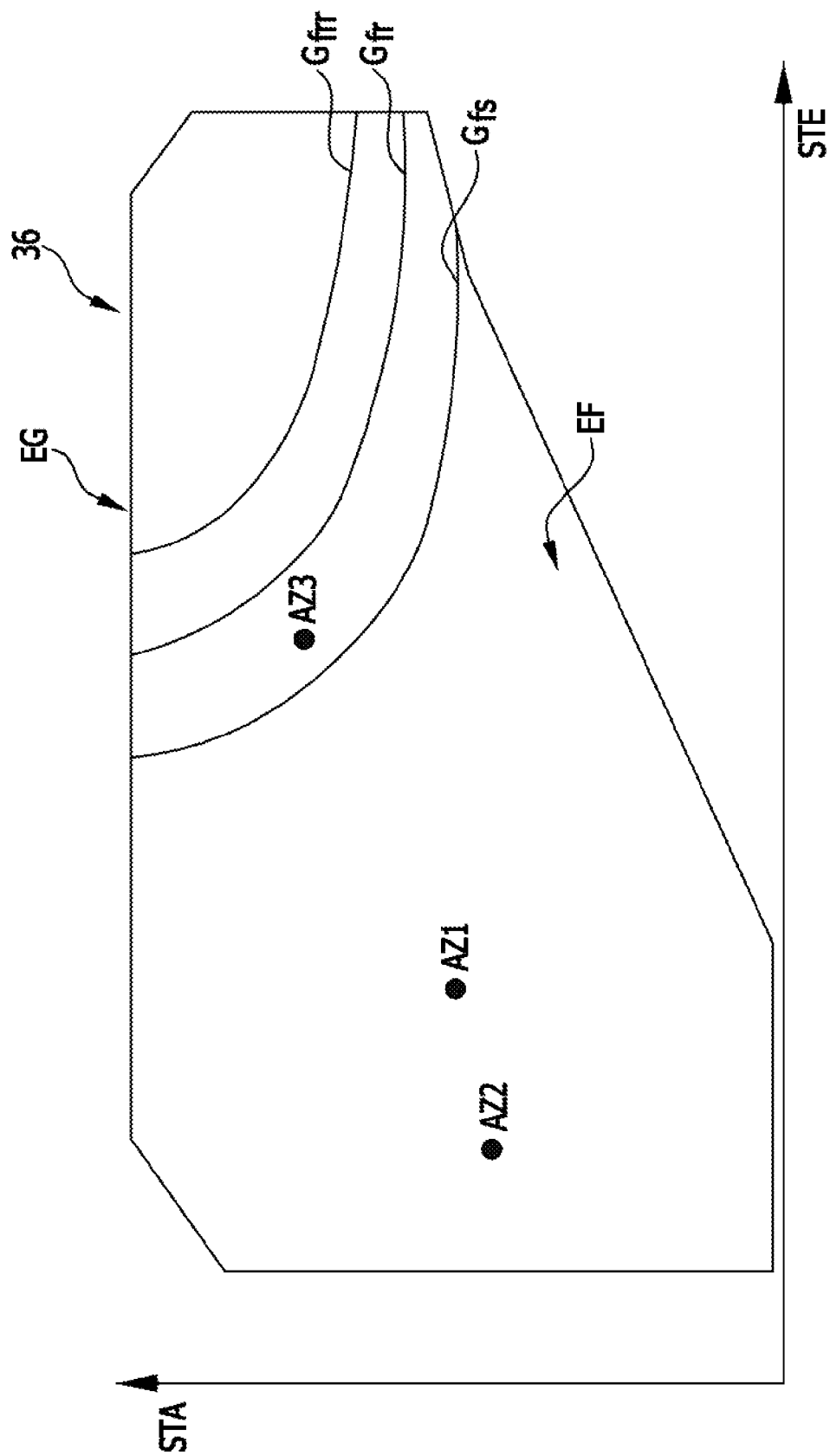

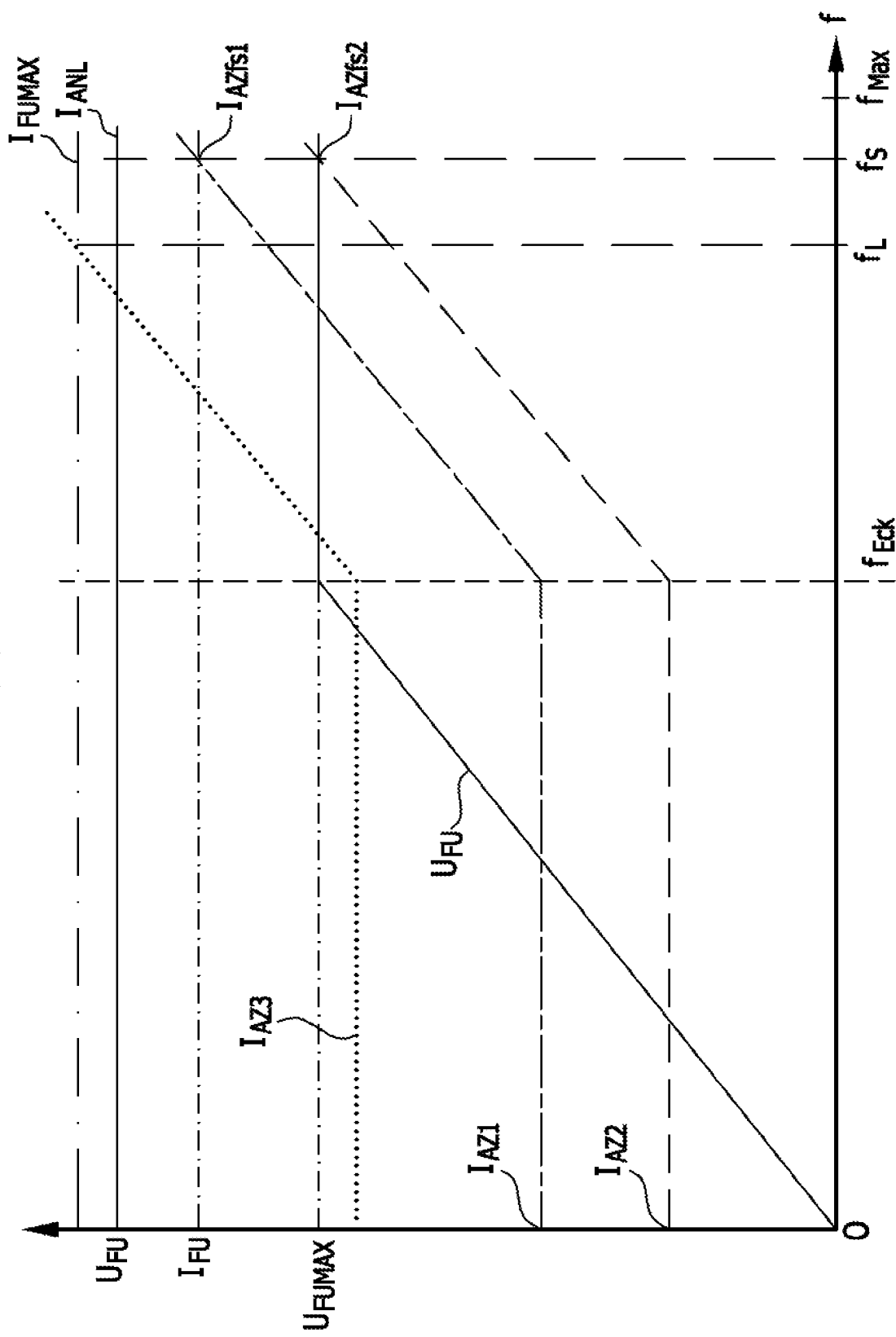

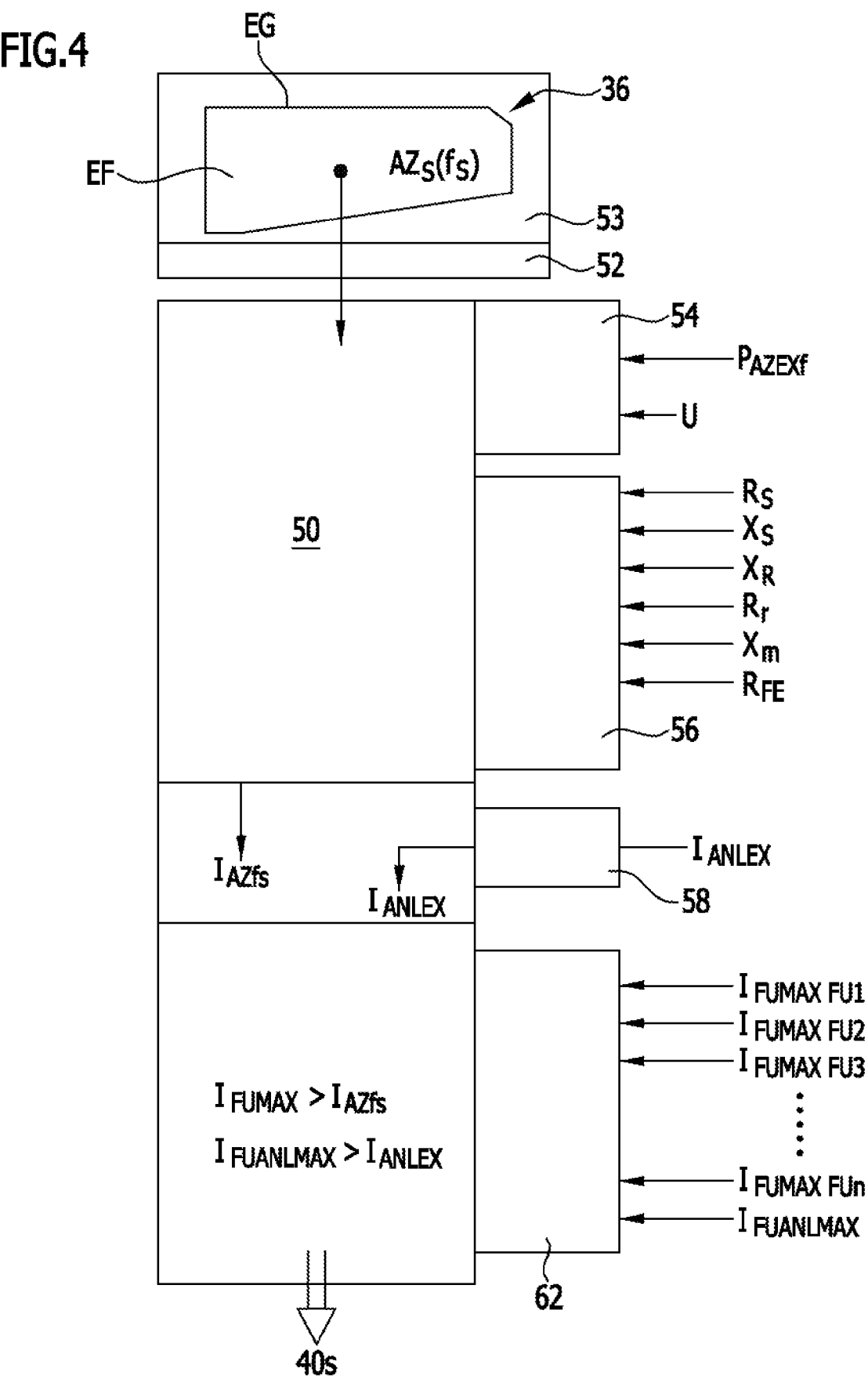

FIG.5

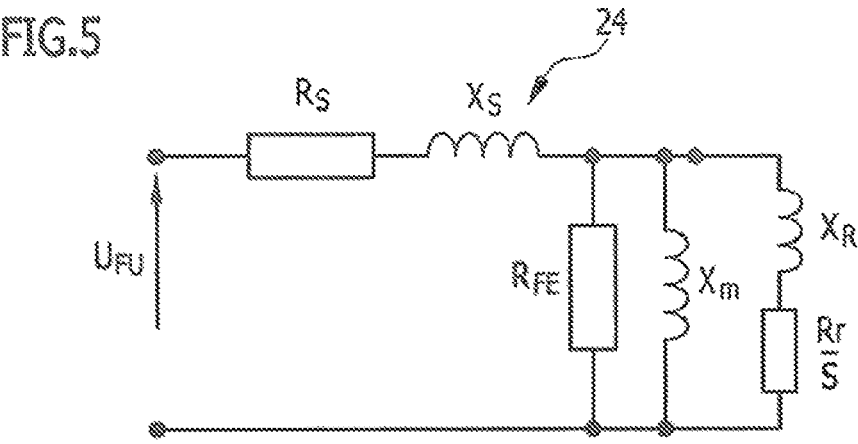

$U_{FU}$ = Output voltage or the frequency converter
$R_S$ = Stator resistance
$X_S$ = Stator reactance
$X_R$ = Rotor reactance
$R_r$ = Rotor restistance
$X_m$ = Magnetizing reactance
$R_{FE}$ = Iron resistance
$S$ = Slip
$Z$ = Motor impedance $$Z = R_S + jX_S + \frac{\frac{(jX_m \cdot R_{FE})}{(jX_m + R_{FE})}(jX_R + \frac{R_r}{S})}{\frac{(jX_m \cdot R_{FE})}{(jX_m + R_{FE})} + jX_R + \frac{R_r}{S}} \quad (F1)$$

$$P_{AZEXfs} = P_{AZ} = U_{FU} \cdot I_{AZ} \cdot \sqrt{3} \ \arctan \frac{Im(Z)}{Re(Z)} \quad (F2)$$

$$P_{AZfs} = \frac{U_{FU}}{\sqrt{3}} \cdot \frac{1}{\sqrt{Im(Z)^2 + Re(Z)^2}} \quad (F3)$$

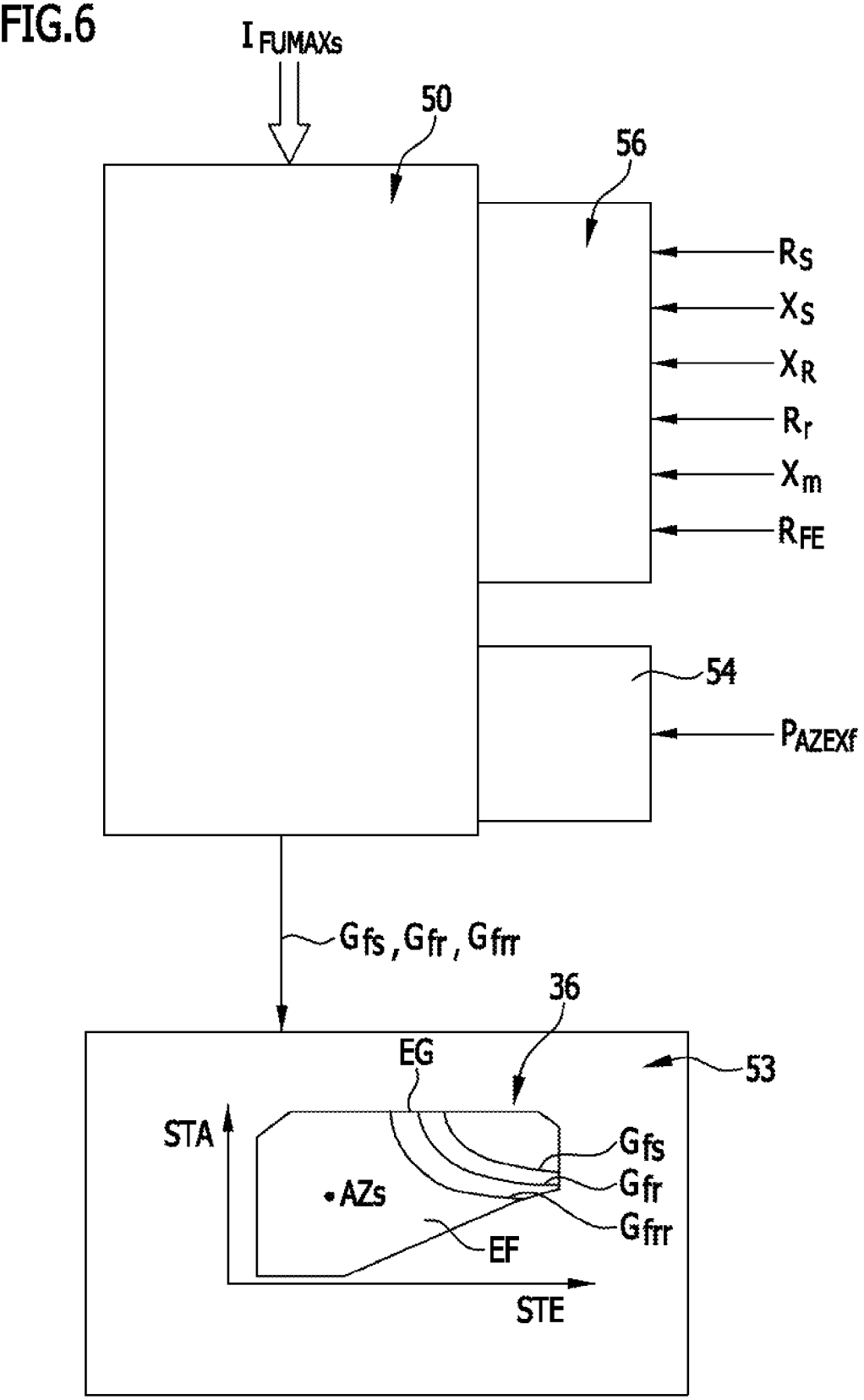

METHOD FOR SELECTING A FREQUENCY CONVERTER FOR A REFRIGERANT COMPRESSOR UNIT

CROSS-REFERENCE TO RELATED PATENT APPLICATION

This application is a continuation of International application number PCT/EP2016/059168 filed on Apr. 25, 2016.

This patent application claims the benefit of International application No. PCT/EP2016/059168 of Apr. 25, 2016, the teachings and disclosure of which are hereby incorporated in their entirety by reference thereto.

BACKGROUND OF THE INVENTION

The invention relates to a method for selecting a frequency converter for a refrigerant compressor unit, including a refrigerant compressor and an electric drive motor.

Hitherto, the frequency converters for refrigerant compressor units have always been selected such that the frequency converter does not restrict the possible working states of the refrigerant compressor.

This has the result that, in the methods known hitherto for selection of the frequency converter, frequency converters that gave rise to unnecessary costs were always used.

The object of the invention is therefore to improve a method for selecting a frequency converter such that the frequency converter is selected in a manner for optimized use.

SUMMARY OF THE INVENTION

This object is achieved according to the invention with a method of the type mentioned in the introduction in that a working state suitable for operation of the refrigerant compressor unit is selected within an application field of an application graph of the refrigerant compressor, in that an operating frequency for this selected working state is selected, and in that a working state operating current value that corresponds to the selected working state and the selected operating frequency is determined from drive data, for operation of the refrigerant compressor unit.

The advantage of the solution according to the invention can be seen in the fact that the working state operating current value provides a benchmark for selection of the frequency converter that enables the frequency converter to be determined simply. For example, the frequency converter to be selected must be at least able to generate a current corresponding to the working state operating current value at the output.

For example, in the solution according to the invention, the drive data is determined in advance, and in particular in dependence on the refrigerant, and are stored in particular for utilization later, when the frequency converter is selected.

The frequency converter can be selected in a particularly simple manner using the working state operating current value. The frequency converter is selected using data on frequency converters available for selection, the selected frequency converter having a maximum converter current value greater than or equal to the working state operating current value.

For example, for this purpose the data of the possible frequency converters is collected in a list that is available, in particular, as a stored file.

Thus, this procedure allows selection of the suitable frequency converter to be optimized in that the frequency converter is selected such that its maximum converter current value is sufficient to operate the refrigerant compressor unit reliably in the selected working state at the selected operating frequency, but an unnecessarily large construction of the frequency converter is avoided, so the frequency converter that is most cost-effective for reliable operation is selected.

Further, for optimizing selection of the frequency converter, it is advantageous if the frequency converter is selected that has the maximum converter current value as close as possible to the working state operating current value.

This ensures that the frequency converter is not constructed to be too large in respect of its maximum converter current value.

When the design of the frequency converter is focused on the maximum converter current value in this manner, it could happen that the frequency converter is not able to apply the start-up current value for the refrigerant compressor unit.

For this reason, it is preferably provided for the frequency converter to be selected such that its maximum converter start-up current value is greater than or equal to a start-up current value of the refrigerant compressor unit.

Preferably here, a stored start-up current value is used for selecting the frequency converter.

More detailed statements have not been made as regards determining the start-up current value.

Here, an advantageous solution provides for the start-up current value to be determined empirically and in particular then to be stored in order to be available for selecting the frequency converter.

This ensures that the start-up current value corresponds to the actual conditions of the refrigerant compressor unit.

In order further to optimize selection of the frequency converter in respect of the start-up current value, it is preferably provided for the frequency converter to be selected such that its maximum converter start-up current value is as close as possible to the start-up current value, with the result that in this respect the frequency converter is not made unnecessarily large in respect of the maximum converter current value.

It is particularly advantageous if the frequency converter is selected such that its maximum converter current value is as close as possible to the higher of the values of working state operating current value and start-up current value, with the result that construction of the frequency converter is optimized to the selected working state in respect of its maximum converter current value.

More detailed statements have not yet been made as regards the drive data.

A solution that reflects actual conditions particularly well provides for the drive data to be determined empirically.

Further, an advantageous solution provides, in each working state of the refrigerant compressor unit, for empirical drive data to be stored for the possible operating frequencies to be selected.

Further, more detailed statements have likewise not been made as regards the operating frequencies to be selected.

Here, an advantageous solution provides for the operating frequency that is to be selected to lie in the range from 0 hertz to 140 hertz.

Preferably, the operating frequency to be selected will lie in the range from a cut-off frequency of the frequency converter to a frequency of 140 hertz, preferably to 90 hertz.

Further, the drive data themselves have not yet been specified in more detail.

Here, a procedure that is simple to implement provides for the drive data to have the empirically determined electrical power consumption for each working state in the application field at the different operating frequencies.

In this case, it is in particular possible to calculate the working state operating current value at the selected operating frequency on the basis of the empirically determined electrical power consumption at the respective operating frequency, taking into account an equivalent circuit of the drive motor of the refrigerant compressor unit.

For determining the working state operating current value, calculation of the working state operating current value is performed by taking into account the impedance of the equivalent circuit of the drive motor.

Further, it is preferably provided, for determining the working state operating current value, to compare the empirically determined power consumption of the refrigerant compressor unit with the power consumption resulting from the equivalent circuit and to determine the slip therefrom, so that all the parameters for complete calculation of the working state operating current value are available.

As a result, the working state operating current value can be determined in particular from the determined slip and the impedance of the equivalent circuit of the drive motor.

More detailed statements have not yet been made as regards the empirically determined stored drive data.

Here, an advantageous solution provides for the empirically determined electrical power consumption of each working state in the application field to be recorded, in particular stored, at the respective operating frequency.

Thus, when the working state operating current value is determined, calculation thereof on the basis of the electrical power consumption is also required, since in respect of the selected working state only the stored electrical power consumption is available in a memory.

As an alternative thereto, another advantageous solution provides for the working state operating current values calculated from the empirically determined power consumption to be recorded, in particular stored, for the respective working state and the respective operating frequency.

This means that for each working state and each operating frequency the working state operating current values have already been calculated and stored, with the result that, when the frequency converter is selected, the already stored working state operating current values can be directly accessed, and there is no need for them to be calculated again before selection.

In a further advantageous solution, it is provided for the working state operating current value for each working state and each operating frequency to be determined empirically and recorded, in particular stored.

This procedure requires more effort in respect of the empirical determination of the working state operating current value, but makes calculation of the working state operating current value from the electrical power consumption and use of the equivalent circuit superfluous, and may therefore represent a favorable solution in certain circumstances or with a particular type of equivalent circuit.

Since the method according to the invention for selecting a frequency converter restricts the working states of the refrigerant compressor that are available in the application field of the application graph, it is preferably provided for the working states in the application field that are associated with the maximum converter current value to be determined on the basis of this maximum converter current value of the selected frequency converter at a selected operating frequency using the drive data.

Determining the working states in this way, from the maximum converter current value determined from the selection of the frequency converter, has the major advantage that as a result the restrictions on the application field and on the working states that can be achieved in the application field, brought about by the inventive selection of the frequency converter, can be determined.

Preferably, for this purpose it is provided for the working states determined for the maximum converter current value to be displayed in the application graph.

In particular, for this purpose a conventional display unit is provided that shows on the one hand the application graph and on the other the working states that form a limitation on the application field in the application graph.

In the context of the explanation above of the solution according to the invention, the assumption is made that there are no further specifications applicable to the frequency converters available for selection.

However, this has the disadvantage that, because of the restrictions on the application field, working states may occur in which the working state operating current value exceeds the maximum converter current value at high operating frequencies.

This usually results in a conventional frequency converter transitioning to malfunction mode in order to protect the frequency converter.

However, a particularly advantageous embodiment of the method according to the invention provides for only frequency converters that include a frequency limiting unit to be made available for selection, wherein, at operating frequencies above a cut-off frequency, the frequency limiting unit limits the operating frequency such that the maximum converter current value of the frequency converter is not exceeded.

Thus, a frequency limiting unit of this kind has the advantage that, despite the inventive selection of the frequency converter, working states of the refrigerant compressor unit are permitted that cannot be implemented in the entire frequency range, and in particular not at operating frequencies above the cut-off frequency, but that when such working states are implemented the frequency converter itself limits the operating frequency such that there is no transition to malfunction mode.

In particular, for this purpose it is provided for the working state operating current value of the frequency converter to be continuously detected by the frequency limiting unit.

In this case, it is possible in particular for the working state operating current value of the frequency converter to be compared with a current reference value and for the operating frequency to be limited to a limit frequency that applies when the current reference value is reached.

In the simplest case, the current reference value is directly the maximum converter current value.

However, in order to detect the case where a maximum compressor operating current value specifically set for the refrigerant compressor unit is not exceeded, it is preferably provided for the frequency limiting unit to take into account both the maximum converter current value and the maximum compressor operating current value, and to determine the limit frequency on the basis of the lowest of the maximum current values.

This ensures that the selected frequency converter does not malfunction even in the working states that can only be implemented at particular operating frequencies, but rather enables these working states of the refrigerant compressor to be implemented, albeit only in a restricted range of the operating frequencies.

Moreover, in the method according to the invention it is further provided for only a frequency converter in which a voltage adapter unit brings about an increase in the output voltage over the operating frequency independently of a fluctuation in a mains voltage to be made available for selection.

This solution has the advantage that even if the mains voltage fluctuates, in particular fluctuating by up to 20%, the selected frequency converter does not vary the increase in the output voltage of the frequency converter over the operating frequency—this increase being essential for flow in the drive motor of the refrigerant compressor unit—but keeps this increase constant.

This is achieved in particular in that a link voltage of the frequency converter is measured and, as a result of a comparison with at least one reference value, a voltage curve of the output voltage of the frequency converter is corrected in order to keep the increase in the output voltage over the operating frequency constant.

Here, in particular the link voltage represents a voltage that is favorable for the method according to the invention, since it is proportional to the mains voltage and thus also directly reflects the fluctuations in the mains voltage.

Furthermore, the invention relates to a data processing unit, wherein reference is made to the corresponding statements regarding the inventive method for the advantages of the data processing unit.

Further, and independently of the solutions described above or indeed in combination therewith, the invention relates to a refrigerant compressor system, including a refrigerant compressor unit having a refrigerant compressor and an electric drive motor, and including a frequency converter for operating the electric drive motor, wherein the frequency converter includes a frequency limiting unit that, at operating frequencies above a cut-off frequency, limits the operating frequency such that the maximum converter current value of the frequency converter is not exceeded.

Thus, a frequency limiting unit of this kind has the advantage that, even without particular interventions, it is possible to operate the refrigerant compressor system in working states of the refrigerant compressor unit that cannot be implemented in the entire frequency range, and in particular not at any operating frequencies above the cut-off frequency, with the available maximum converter operating current, since when such working states are implemented the frequency converter itself limits the operating frequency such that there is no transition to malfunction mode.

In particular, for this purpose it is provided for the working state operating current value of the frequency converter to be continuously detected by the frequency limiting unit.

In this case, it is possible in particular for the working state operating current value of the frequency converter to be compared with a current reference value and for the operating frequency to be limited to a limit frequency that applies when the current reference value is reached.

In the simplest case, the current reference value is directly the maximum converter current value.

However, in order also to cover a case in which a maximum compressor operating current value that is recorded specifically for the refrigerant compressor unit is not exceeded, it is preferably provided for the frequency limiting unit to take into account as the current reference value both the maximum converter current value and the maximum compressor operating current value, and to determine the limit frequency on the basis of the lowest of the maximum current values.

This ensures that the selected frequency converter does not malfunction even in the working states that can only be implemented at particular operating frequencies, but rather enables these working states of the refrigerant compressor to be implemented, albeit only in a restricted range of the operating frequencies.

Further, and independently of the solutions described above or indeed in combination therewith, the invention relates to a refrigerant compressor system, including a refrigerant compressor unit having a refrigerant compressor and an electric drive motor, and including a frequency converter for operating the electric drive motor, wherein the frequency converter includes a voltage adapter unit that controls an increase in the output voltage over the operating frequency such that this increase is performed independently of a fluctuation in a mains voltage.

This solution has the advantage that even if the mains voltage fluctuates, in particular fluctuating by up to 20%, the selected frequency converter does not vary the increase in the output voltage of the frequency converter over the operating frequency—this increase being essential for flow in the drive motor of the refrigerant compressor unit—but keeps this increase constant.

This is achieved in particular in that the voltage adapter unit detects a link voltage of the frequency converter and, as a result of a comparison with at least one reference value, corrects the increase in the output voltage of the frequency converter in the event of deviations from the at least one reference value, in order to keep the increase in the output voltage over the operating frequency constant.

Here, in particular the link voltage represents a voltage that is favorable for the method according to the invention, since it is proportional to the mains voltage and thus also directly reflects the fluctuations in the mains voltage.

The correction in the increase in the output voltage over the operating frequency can be implemented in a simple manner if the voltage adapter unit generates a proportionality correction factor which is used to correct the increase in the output voltage of the frequency converter.

Specific statements have not yet been made as regards the reference values.

It has proved favorable if the reference values used by the voltage adapter unit include at least one of the following values, for example: a reference frequency, a proportionality factor and a link voltage setpoint value.

An advantageous solution for correcting the increase in the output voltage provides for the frequency converter to have a frequency converter controller which, on the basis of a frequency request signal, generates a voltage control signal that, in addition to the frequency request signal, is supplied to an inverter stage controller of an inverter stage of the frequency converter, and for the voltage adapter unit to cooperate with the frequency converter controller for controlling the increase in the output voltage over the operating frequency.

As regards the construction of the frequency converter controller, it is preferably provided for the frequency converter controller to have a proportional member which, on the basis of the frequency request signal of the voltage control signal, generates the voltage control signal, and for the voltage adapter unit to correct a proportionality behavior of the proportional member.

In particular here, it is provided for the proportionality behavior of the proportional member to be corrected using the proportionality correction factor.

Further features and advantages form the subject matter of the description below and the representation in the drawings of some exemplary embodiments.

BRIEF DESCRIPTION OF THE DRAWINGS

FIG. 2 shows a schematic illustration of an application graph of the refrigerant compressor unit, with an application field that is enclosed by an application limit and records the permitted working states of the refrigerant compressor unit;

FIG. 3 shows an illustration of a curve of an output voltage of the frequency converter over an operating frequency, and a curve of a working state operating current value over the operating frequency;

FIG. 4 shows a schematic illustration of a data processing unit for optimum selection of a frequency converter, corresponding to a first exemplary embodiment of the solution according to the invention;

FIG. 5 shows an illustration of an equivalent circuit of a drive motor of the refrigerant compressor unit, with indications of the equations for motor impedance, electrical power consumption and working state operating current value at a particular operating frequency;

FIG. 6 shows a schematic illustration of a method according to the invention for determining limits to the application field that are produced by the inventive selection of the frequency converter according to the first exemplary embodiment;

DETAILED DESCRIPTION OF THE INVENTION

Figure 1:
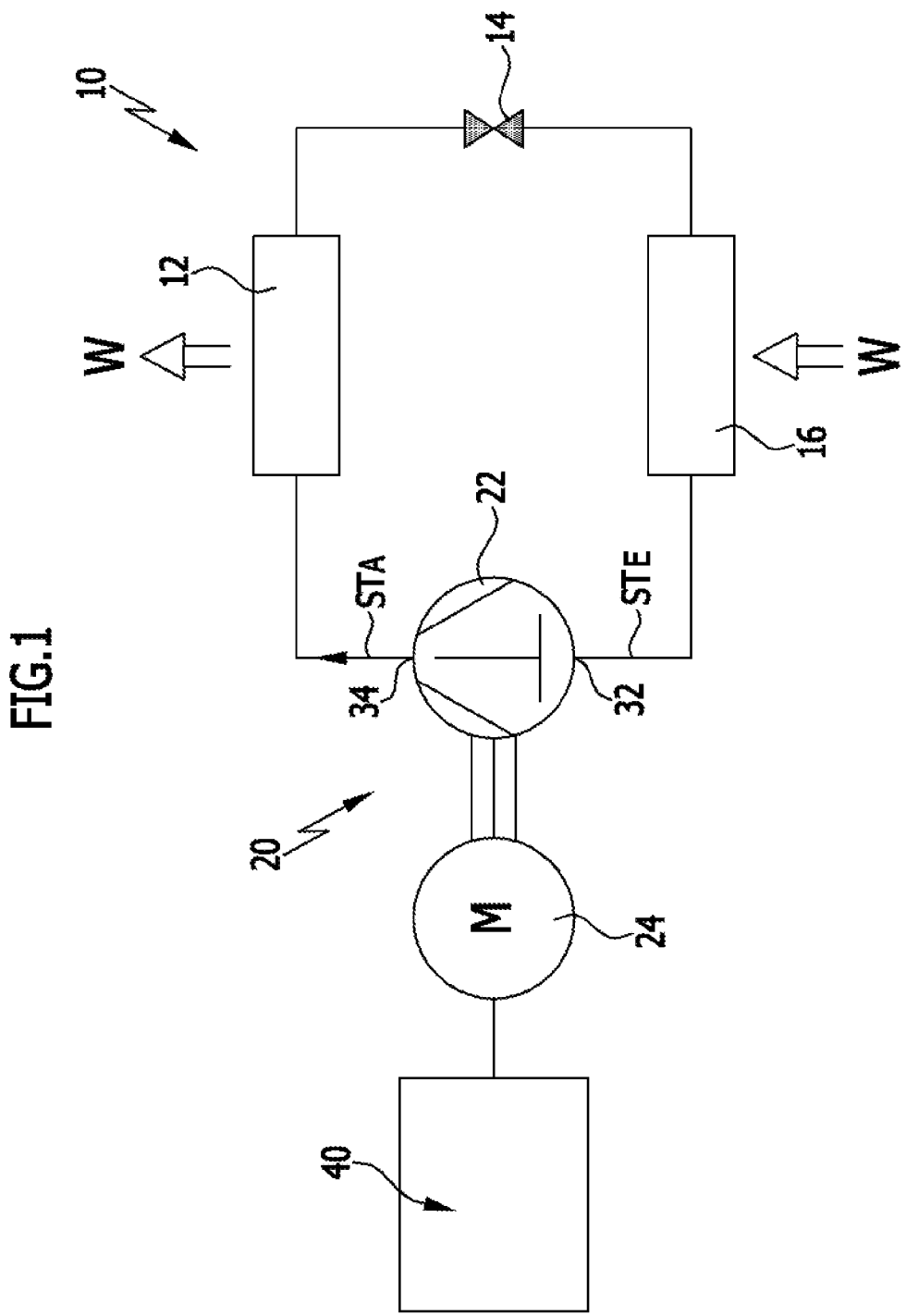
FIG. 1 shows a schematic illustration of a refrigerant circuit having a refrigerant compressor unit, operated using a converter.

A refrigerant circuit 10 that is illustrated schematically in FIG. 1 includes a refrigerant compressor unit 20 that has a refrigerant compressor 22 and an electric drive motor 24 driving the refrigerant compressor 22, wherein the refrigerant compressor 22 and the drive motor 24 may for example be integrated into one unit.

The refrigerant compressor 22 in the refrigerant circuit 10 compresses the refrigerant circulated around the refrigerant circuit 10, and the refrigerant is then supplied to a heat exchanger unit 12 that is on the pressurized side of the refrigerant circuit 10 and in which the compressed refrigerant is cooled, in particular condensed, by a discharge of heat W.

The cooled, in particular condensed, refrigerant is supplied to an expansion member 14 in the refrigerant circuit 10, and the compressed, in particular condensed and pressurized, refrigerant is expanded there and then supplied in the refrigerant circuit 10 to a heat exchanger unit 16 in which the expanded refrigerant is able to take up heat W, in order in this way to perform its cooling action.

The refrigerant that is expanded in the heat exchanger unit 16 is then supplied to the refrigerant compressor 22 again and compressed by the refrigerant compressor 22.

The expanded refrigerant which has already taken up heat in the heat exchanger unit 16 is thus supplied to an input 32 of the refrigerant compressor 22 at a saturation temperature STE, is then compressed in the refrigerant compressor 22 and comes out of an output 34 of the refrigerant compressor at a saturation temperature STA.

As a result of its construction and refrigerant, the refrigerant compressor 22 operates without being damaged only with particular paired values of the saturation temperature STE at the input 32 and the saturation temperature STA at the output 34 of the refrigerant compressor 22, and these values are defined by an application graph 36 shown in FIG. 2, wherein the saturation temperature STE at the input 32 is shown on the X axis of the application graph 36 and the saturation temperature STA at the output 34 is shown on the Y axis.

Here, in the application graph 36, which is also predetermined in particular in dependence on the refrigerant, all the paired values of saturation temperature STE at the input 32 and saturation temperature STA at the output 34 of the refrigerant compressor 22 that are permissible for the refrigerant compressor 22 lie within an application field EF that is enclosed on all sides by an application limit EG. Application graphs of this kind for refrigerant compressors are explained for example in the book "*Lexikon der Kältetechnik* [Dictionary of Refrigeration Engineering]" by Dieter Schmidt (published by C. F. Müller), to which the reader is referred in this regard.

The paired values of saturation temperature STE from the input 32 and saturation temperature STA at the output 34 that are permissible within the application field EF each define a working state AZ of the refrigerant compressor 22 that can be implemented using the respective refrigerant compressor 22.

Because the refrigerant compressor 22 is driven by the electric drive motor 24, each working state AZ requires a certain electrical power consumption $P_{AZ}$ of the drive motor 24.

Here, the electrical power consumption value $P_{AZ}$ of the drive motor 24 is dependent on the one hand on the respective working state AZ in the application field EF and on the other on the speed of rotation of the refrigerant compressor 22.

If the refrigerant compressor 22 is operated at different speeds using a frequency converter 40, then the speed of the refrigerant compressor 22 is proportional to the operating frequency f supplied to the drive motor 24 by the frequency converter 40.

Thus, an electrical power consumption value $P_{AZ}$ is associated with each working state AZ within the application field EF at a certain operating frequency f.

However, the electrical power consumption value $P_{AZ}$ of the electric drive motor 24 depends not only on the working state AZ of the refrigerant compressor 22 but also on the type of electric drive motor 24 and the layout in which the windings thereof are connected to the frequency converter 40.

In the exemplary embodiment illustrated, the assumption is made that the electric drive motor 24 is an asynchronous motor or indeed a permanent-magnet motor whereof the windings are connected to the frequency converter 40 in a star layout.

As illustrated in FIG. 3, this layout of connecting the drive motor 24 to the frequency converter 40 has the result that, when the drive motor 24 is operated with the frequency converter, the output voltage $U_{FU}$ generated by the frequency converter 40 increases linearly as operating frequency f increases, from the operating frequency f=0 until a cut-off frequency $f_{ECK}$ is reached, above which the output voltage $U_{FU}$ no longer increases but has reached its maximum output voltage $U_{FUMAX}$.

If there is a further increase in the operating voltage f to a maximum frequency $f_{max}$, the output voltage $U_{FUMAX}$ at which the drive motor 24 is operated remains constant.

The maximum operating frequency $f_{max}$ of the frequency converter 40 for operating the electric drive motor is on the one hand affected by the construction of the electric drive motor 24 and on the other hand by the construction of the refrigerant compressor 22, and is conventionally around values of 80 hertz or less, while the cut-off frequency $f_{ECK}$ is conventionally in the range between 40 and 60 hertz.

In this mode of the electric drive motor 24, the operating current in the respective working state AZ is likewise dependent on the operating frequency f, resulting in working state operating current values $I_{AZ}$ that are constant between the operating frequencies f=0 and $f_{eck}$ but increase further at operating frequencies f above the cut-off frequency $f_{eck}$, for example to the maximum operating frequency $f_{max}$.

Here, the maximum output voltage $U_{FUMAX}$ that is available at the output of the frequency converter 40 for operating the drive motor 24 is proportional to the link voltage of the frequency converter 40 and thus proportional to the supply voltage of the frequency converter 40.

As illustrated in FIGS. 2 and 3, the power consumption value $P_{AZ1}$ in a working state AZ1 of the application graph 36 is for example greater than in a working state AZ2 of the application graph 36, which has the consequence, as in FIG. 3, that the working state operating current values $I_{AZ1}$ have higher values than the working state operating current values $I_{AZ2}$ in the working state AZ2.

Thus, FIGS. 2 and 3 illustrate the fact that the working state operating current values $I_{AZ}$ made available by the frequency converter 40 depend on the working states AZ and thus, depending on the working state AZ, the frequency converter 40 must be able to generate working state operating current values $I_{AZ}$ of different size.

The costs of the frequency converter 40 depend on the maximum converter current value $I_{FUMAX}$ that a frequency converter 40 can make available, and the greater the maximum converter current value $I_{FUMAX}$ the higher the costs.

If the selection of the frequency converter 40 according to the working state $AZ_s$ provided by the user of the refrigerant compressor unit 20 when the frequency converter 40 is used, which may be for example the working state AZ1 or AZ2, and the selected operating frequency $f_s$ are now optimized, then it is possible to optimize selection of the frequency converter 40 by taking into account the working state $AZ_s$ provided by the user and the operating frequencies $f_s$ in that the frequency converter 40 is selected taking into account the provided working state $AZ_s$ and operating frequency $f_s$ such that the frequency converter 40 is selected in such a way that the maximum converter current value $I_{FUMAX}$ is selected to be greater than the working state operating current value $I_{AZfs}$ required for the selected working state $AZ_s$ at the provided operating frequency $f_s$.

For this, the working state operating current value $I_{AZfs}$ has to be determined.

The working state operating current value $I_{AZfs}$ with the respective operating frequency $f_s$ is determined, as illustrated in FIG. 4, using a data processing unit 50 that includes an input unit 52, in particular combined with a display unit 53, for displaying the application graph 36 and for selection of the working state $AZ_s$ and the operating frequency $f_s$.

For this purpose, the data processing unit 50 uses empirically determined drive data to characterize the drive motor 24 of the refrigerant compressor unit 20.

For example, in a first exemplary embodiment it is provided for the power consumption values $P_{AZ}$ for the respective working states AZ in the application field EF of the refrigerant compressor unit 20 at the respective operating frequency f to be determined empirically, and to be stored in a memory 54 associated with the data processing unit 50, as empirical power consumption values $P_{AZEXf}$ in the form of a power data field. These electrical power consumption values $P_{AZEXf}$ then provide the possibility, taking into account the Steinmetz equivalent circuit for the drive motor 24, which is illustrated in FIG. 5, and the known resistance values R and reactance values X, which are stored in a memory 56 associated with the data processing unit 50, of calculating the impedance Z according to formula (F1) of the drive motor 24 and then, comparing the empirically determined power consumption value $P_{AZfs}$ of selected operating frequency $f_s$ with the theoretical power consumption value $P_{AZ}$ of impedance Z, of determining the slip s iteratively from the formula (F2) and then using the slip s to determine the working state operating current value $I_{AZfs}$ from the formula (F3) with the respectively selected operating frequency $f_s$.

The relationships and formulae presented in FIG. 5 may be varied slightly, depending on the approximations and assumptions made in the Steinmetz equivalent circuit.

Thus, a Steinmetz equivalent circuit with the associated formulae is described in the book "*THE PERFORMANCE AND DESIGN OF ALTERNATING CURRENT MACHINES*", by M. G. Say, third edition, 1958, in Pitman Paperbacks, 1968, SBN 273 401998, pages 270 ff.

A similar Steinmetz equivalent circuit with the corresponding formulae can be found in Wikipedia in English, under "Induction Motor", as at 4 Apr. 2016, and the references cited there.

Taking as a starting point this working state operating current value $I_{AZfs}$, the appropriate frequency converter 40 is now determined in that the maximum converter current value $I_{FUMAX}$ made available by the frequency converter 40 must be greater than the working state operating current value $I_{AZfs}$ determined for the respective working state AZ at the selected frequency $f_s$.

As a further constraint on the frequency converter 40 to be selected a start-up current value $I_{ANLEX}$ for the respective refrigerant compressor unit 20 is also used, which has likewise been determined empirically and stored in a memory 58 and may, where appropriate, be greater than the working state operating current value $I_{AZfs}$.

For starting up the refrigerant compressor unit 20, the frequency converter 40 is constructed to be resistant to overload, with the result that a maximum converter start-up current value $I_{FUANLMAX}$ that is greater than the maximum converter current value $I_{FUMAX}$ is briefly available, for example being able to be 170% of the maximum converter current value $I_{FUMAX}$ for a period of 3 seconds.

In this way, for selection of the frequency converter 40, illustrated schematically in FIG. 4, it is relevant that the maximum converter current value $I_{FU}$ is greater than the working state operating current value $I_{AZfs}$, and the maximum converter start-up current value $I_{FUANLMAX}$ is greater than the start-up current value $I_{ANLEX}$ of the refrigerant compressor unit 20, as illustrated for example in FIG. 3. The maximum converter current $I_{FUMAX}$ and the maximum converter start-up current $I_{FUANLMAX}$ should, however, be as close as possible to the working state operating current value $I_{AZfs}$ and the start-up current value $I_{ANLEX}$ in order to select a frequency converter with as small as possible a maximum converter current value $I_{FUMAXs}$, which represents the lowest-cost solution.

With a frequency converter 40 selected in this way, because of the selection method it is ensured that the frequency converter is able to operate the refrigerant compressor unit 20 in the selected working state $AZ_s$, but a frequency converter 40 selected in this way does not ensure that the refrigerant compressor 22 can consequently be operated in all the working states AZ within the application field EF.

Rather, this procedure and the selection of the frequency converter 40 such that the frequency converter need only be able to supply the working state operating current $I_{AZfs}$ and the start-up current value $I_{ANLEX}$ have the effect of restricting the application field EF.

In order to display to a user the restriction of the application field EF that results from the selection made of the frequency converter 40, then as illustrated for example in FIG. 6, and on the basis of the maximum converter current value $I_{FUMAX}s$ of the selected frequency converter 40s, the working states AZ in the application field EF that are associated with this maximum converter current value $I_{FUMAX}$ are determined for the selected operating frequency $f_s$ or indeed at other operating frequencies $f_s'$, using the equivalent circuit of the drive motor 24 illustrated in FIG. 4 with the known resistance values R and the known reactance values X from the memory 56, and using the formulae for electrical power consumption and working state operating current $I_{AZ}$ that are illustrated in FIG. 5 and are associated with the equivalent circuit of the drive motor 24, taking into account the power consumption values $P_{AZEX}$ stored in the memory 54 for the different working states AZ in the application field EF at the respectively selected operating frequencies $f_s$.

For this purpose, the maximum converter current value $I_{FUMAXs}$ of the selected converter 40s is used for the current $I_{AZfs}$ according to the formula F3, the slip s is determined from this, and the formula F2 is used to calculate the power consumption value $P_{AZCAL}$, and then, using the empirical power consumption values $P_{AZEX}$ stored in the memory 54, all the working states AZCAL(fs) that correspond to the calculated power consumption value $P_{AZCAL}$ at the selected operating frequency $f_s$ are determined.

The sum of these working states $A_{ZCALfs}$ gives a boundary line $G_{fs}$ in the application graph 36, as illustrated in FIG. 2.

This calculation results in the boundary lines $G_{fs}$ illustrated in FIG. 2 and FIG. 6 for different selected operating frequencies $f_s$; for example the boundary line $G_{fs}$ represents the boundary line for the application field EF at the operating frequency $f_s$ that is selected for selection of the frequency converter 40, the boundary line $G_{fr}$ represents for example a boundary line for the limit of the application field EF at a smaller operating frequency fr than the selected operating frequency fs, and the boundary line $G_{frr}$ represents for example a boundary line of the application field EF for an operating frequency frr selected to be even smaller, and these are displayed by the data processing unit 50 on a display unit 53 together with the application graph 36.

Thus, a user of the method according to the invention is also at the same time provided with information on the restrictions resulting from the selection of the frequency converter 40 in accordance with the selection method described above, and a user can check whether these restrictions of the application field EF do or do not rule out possible potential working states AZ that could where appropriate also be applicable for use of the refrigerant compressor unit 20.

Figure 7:
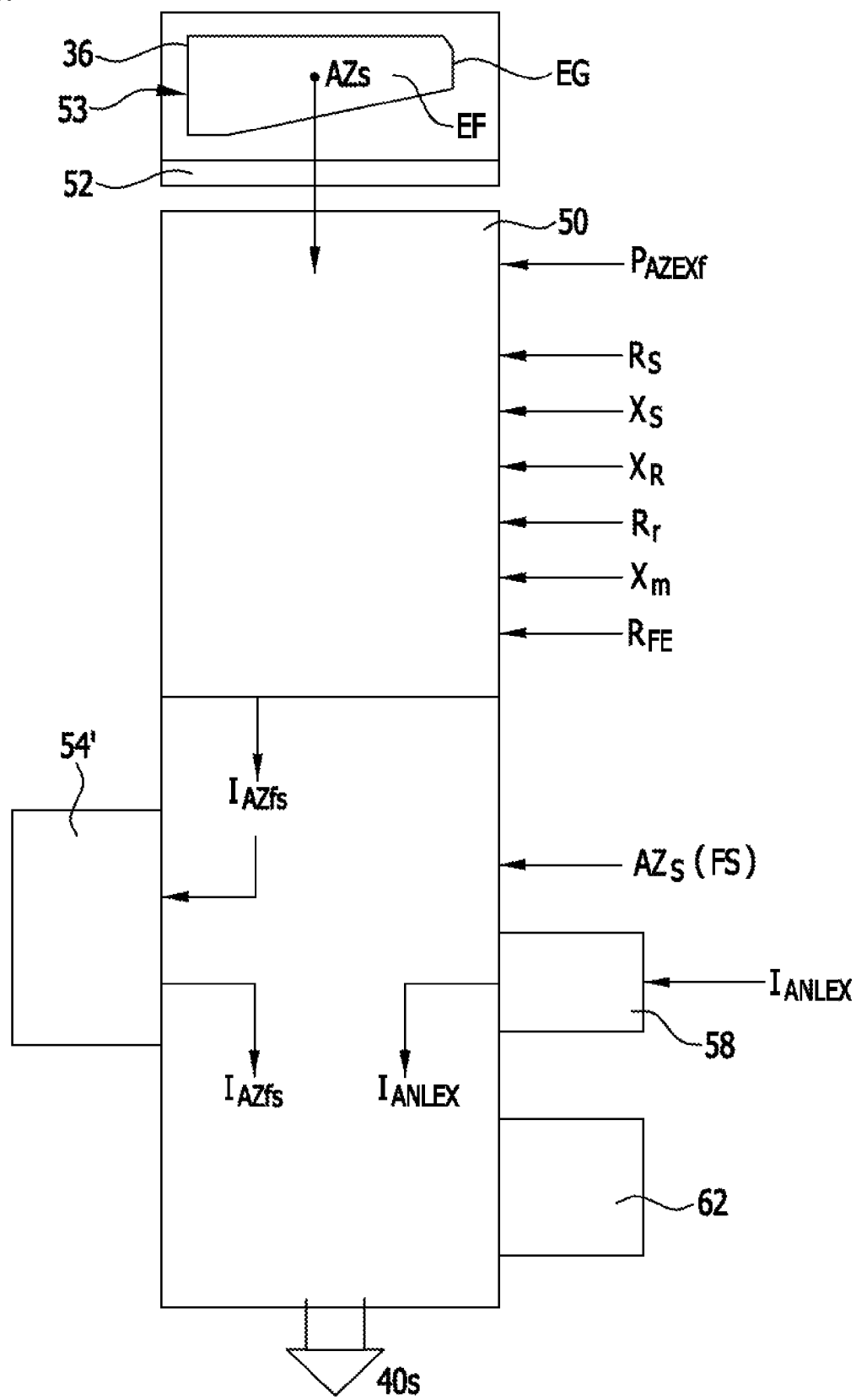
FIG. 7 shows a schematic illustration of a second exemplary embodiment of a method according to the invention for selecting a frequency converter.
Figure 8:
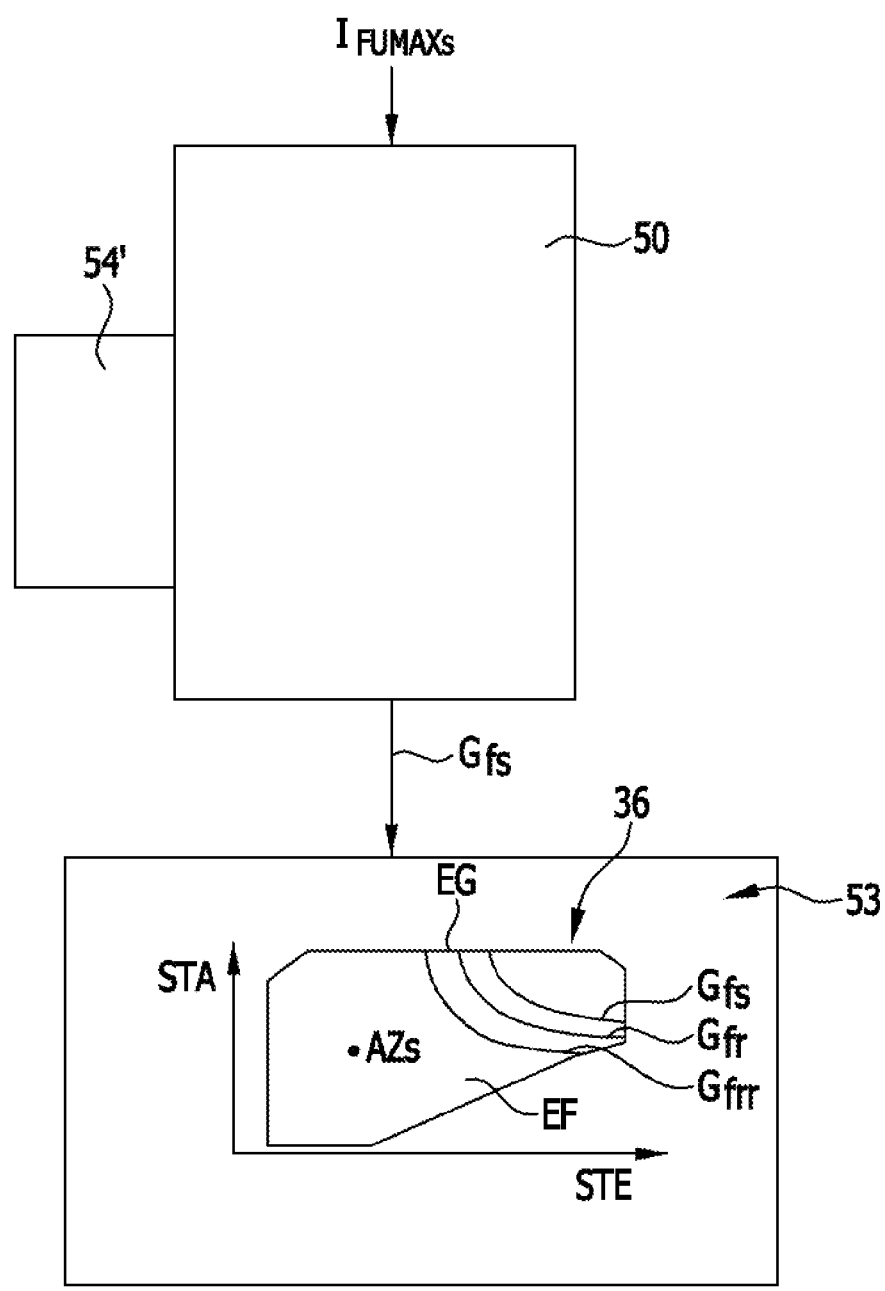
FIG. 8 shows a schematic illustration of the second exemplary embodiment of the frequency converter according to the invention during determination of the restrictions on the application field.

In a second exemplary embodiment, as illustrated in FIG. 7, as an alternative to the first exemplary embodiment it is provided for the current $I_{AZf}$ to be determined in the manner described in conjunction with the first exemplary embodiment, using the data processing unit 50 for each empirically determined power consumption value $P_{AZEXf}$ with the respective operating frequency f, using the resistance values R and reactance values X of the Steinmetz equivalent circuit that are known from FIG. 5 for each individual working state AZ, and to be stored in a memory 54' such that when a user makes a selection of the working state $AZ_s$ and the selected operating frequency $f_s$, the corresponding working state operating current value $I_{AZfs}$ may be accessed directly in the memory 56, and this working state operating current value $I_{AZfs}$ corresponding to the selected working state $AZ_s$ can be read off directly without further action, and, using the empirically determined start-up current value $I_{ANLEX}$ the selection of the frequency converter 40s can be performed, using the maximum frequency converter currents $I_{FUMAX}$ stored in the memory 62, in the manner already explained in conjunction with the first exemplary embodiment.

Similarly, in the second exemplary embodiment, once the frequency converter 40s has been established, the maximum frequency converter current $I_{FUMAXs}$ may be used to determine the working states $AZCAL_{fs}$ associated with this current value in the memory 54', and to display the sum of all these working states $AZCAL_{fs}$ as the respective boundary line $G_{fs}$ for example on a display unit 64, as described in conjunction with the first exemplary embodiment.

In a third exemplary embodiment, as an alternative to the first and second exemplary embodiments, it is provided, in an analogous manner to the second exemplary embodiment, for the working state operating current values $I_{AZf}$ to be determined empirically in the memory 54' and stored in the memory 54' such that in the third exemplary embodiment, in a similar manner to the second exemplary embodiment, selection of the frequency converter 40s can take as a starting point the values in the memory 54'.

Similarly, and conversely, when determining the boundary lines $G_{fs}$, the data processing unit 50 can proceed in accordance with the second exemplary embodiment, in which case the empirically determined working state operating current values $I_{AZf}$ are stored in the memory 54' and are then used to determine the boundary line $G_f$ with the maximum converter current value $I_{FUMAX}s$ established by the selected frequency converter 40s.

Preferably, the frequency of the frequency converter 40s used is controlled by a frequency control unit 70, which on one side detects the saturation temperature STE or indeed, as an alternative, detects the saturation pressure at the input 32 of the refrigerant compressor 22 and supplies it to a comparator member 74, across which on the other side a temperature specifying signal TV is applied.

Depending on how much the saturation temperature STE deviates from the temperature specifying signal TV, a proportional regulator 76 is triggered, and this generates a frequency request signal FAS that is supplied to a frequency converter controller 78 which then, in a manner corresponding to the frequency request signal FAS, specifies the frequency f of the frequency converter 40s at which the drive motor 24 is then operated.

If selection of the frequency converter 40s is made in accordance with one of the exemplary embodiments described above, then, as illustrated in FIG. 3, when the refrigerant compressor unit 20 is operated, as in FIGS. 2 and 3 a working state AZ3 may occur in which the working state operating current $I_{AZ3}$ as illustrated in FIG. 3 is sufficiently high for it to happen, at frequencies f above the cut-off frequency $f_{ECK}$, that the maximum converter current value $I_{FUMAX}$ is already reached at a limit frequency $f_L$, wherein the limit frequency $f_L$ is lower than the operating frequency $f_s$ provided for example for the working state AZ1.

This would have the result, in a conventional construction, that the frequency converter 40s would switch off because of overload.

Figure 9:
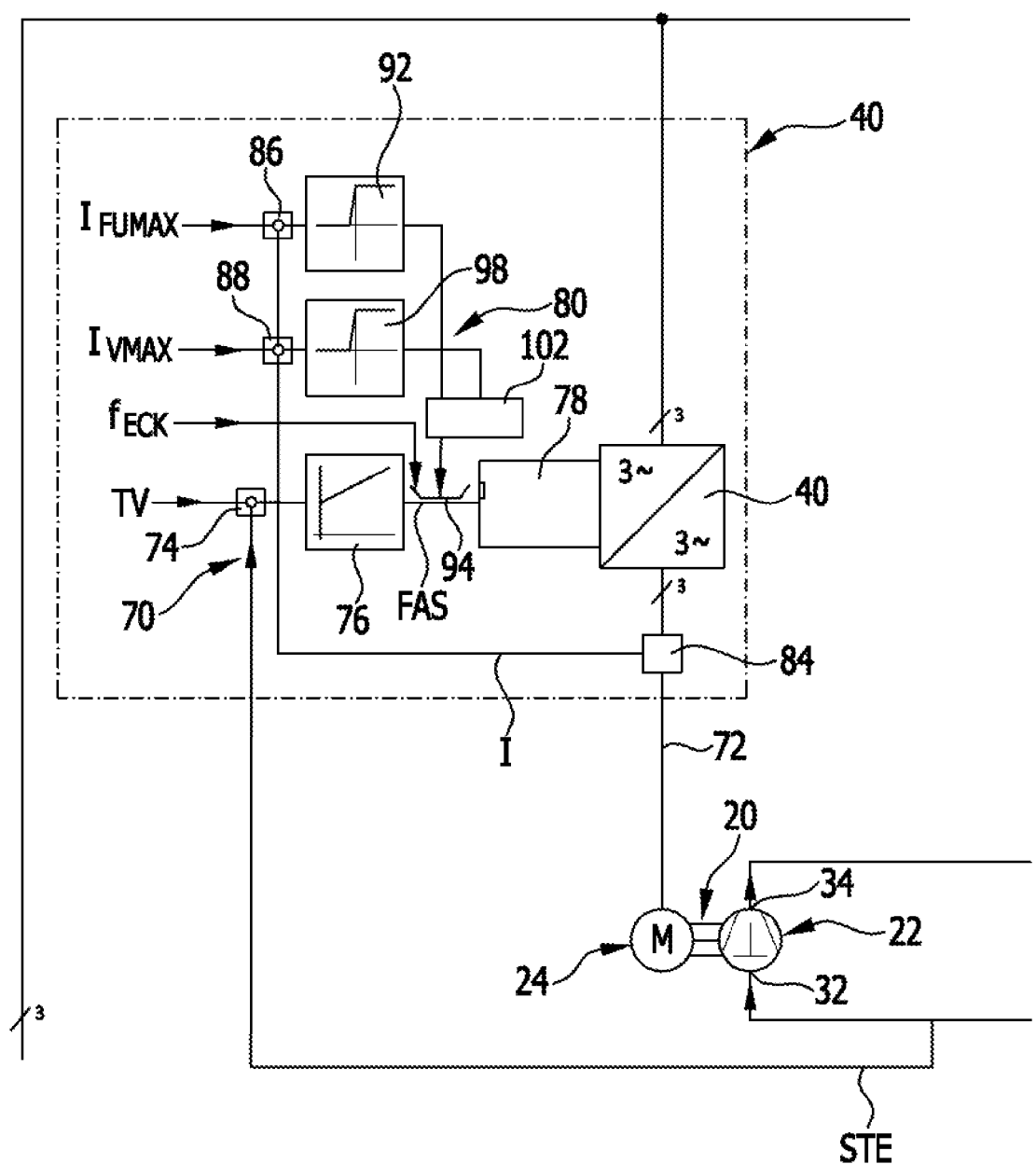
FIG. 9 shows a schematic illustration of a frequency converter having a frequency limiting unit.

For this reason, with a frequency converter 40 according to the invention, as illustrated in FIG. 9 a frequency limiting unit 80 is provided that limits the operating frequency f of the frequency converter 40 when it is above the cut-off frequency $f_{ECK}$ such that the working state operating current value $I_{AZ}$ does not exceed the maximum converter current value $I_{FUMAXs}$ but at most reaches the maximum converter current value $I_{FUMAXs}$.

This ensures that the frequency converter 40s does not switch off even in working states that, at operating frequencies f above the cut-off frequency $f_{ECK}$, could result in a current of the frequency converter 40 exceeding the maximum converter current value $I_{FUMAX}$.

As illustrated in FIG. 9, the frequency limiting unit 80 includes a current sensor 84 that is arranged in a supply line 72 leading from the frequency converter 40s to the drive motor 24 and that measures the actual working state operating current value $I_{AZ}$ and supplies it to a comparator member 86 which compares the actual working state operating current value $I_{AZ}$ with the maximum converter current value $I_{FUMAX}$ as a predetermined value and supplies the comparison result to a limit regulator 92, for example a proportional regulator, which if the working state operating current $I_{AZ}$ actually measured by the current sensor 84 is greater than the maximum converter current value $I_{FUMAX}$ serving as a reference value generates a frequency limiting signal for a frequency limiting member 94 that acts on the frequency request signal FAS and prevents a further increase in the operating frequency f.

Preferably, there is additionally provided a comparator member 88 coupled to the current sensor 84 which compares the working state operating current value $I_{AZ}$ measured by the current sensor 84 with a maximum compressor operating current value $I_{vMAX}$ and triggers a limit regulator 98, for example a proportional regulator, when the working state operating current value $I_{AZ}$ actually measured by the current sensor 84 approximates to the maximum compressor operating current value, $I_{vMAX}$. A frequency limiting signal is generated and transmitted to the frequency limiting member 94.

Preferably, the frequency limiting signals of the limit regulators 92 and 98 are compared with one another in a minimizing member 102, and in each case the frequency limiting signal that leads to the lowest limit frequency $f_L$ is supplied to the frequency limiting member 94.

Further, preferably there is transmitted to the frequency limiting member 94 as a reference value the cut-off frequency $f_{ECK}$, which represents the minimum frequency at which frequency limitation is performed by the frequency limiting member 94.

For optimum operation of the frequency converter 40, the increase in the output voltage $U_{FU}$ of the frequency converter 40 over the frequency f in the range from f=0 to f=$f_{ECK}$ is significant, since the increase in the output voltage $U_{FU}$ over the frequency f of the frequency converter 40 is relevant for forming the flow in the drive motor 24.

Provided the maximum output voltage $U_{FUMAX}$ is constant, this has the consequence that the cut-off frequency $f_{ECK}$ can also be constant, with the result that the increase in the output voltage $U_{FU}$ over the frequency f is likewise always constant.

If, however, with a frequency converter 40s the supply voltage fluctuates, for example as a result of a poor-quality mains network, then the maximum output voltage $U_{FU}$ of the frequency converter 40 at its output is not constant, so with a constant cut-off frequency $f_{ECK}$ the increase in the output voltage $U_{FU}$ would necessarily vary in the frequency range between f=0 and f=$f_{ECK}$.

In order to keep the increase in the output voltage $U_{FU}$ over the frequency constant, even with fluctuations in the mains network that are more than negligible and thus fluctuation in the maximum output voltage $U_{FUMAX}$ of the frequency converter 40 that is more than negligible, it is also necessary to vary the cut-off frequency $f_{ECK}$ in a manner corresponding with the variation in the maximum output voltage $U_{FUMAX}$.

Figure 10:
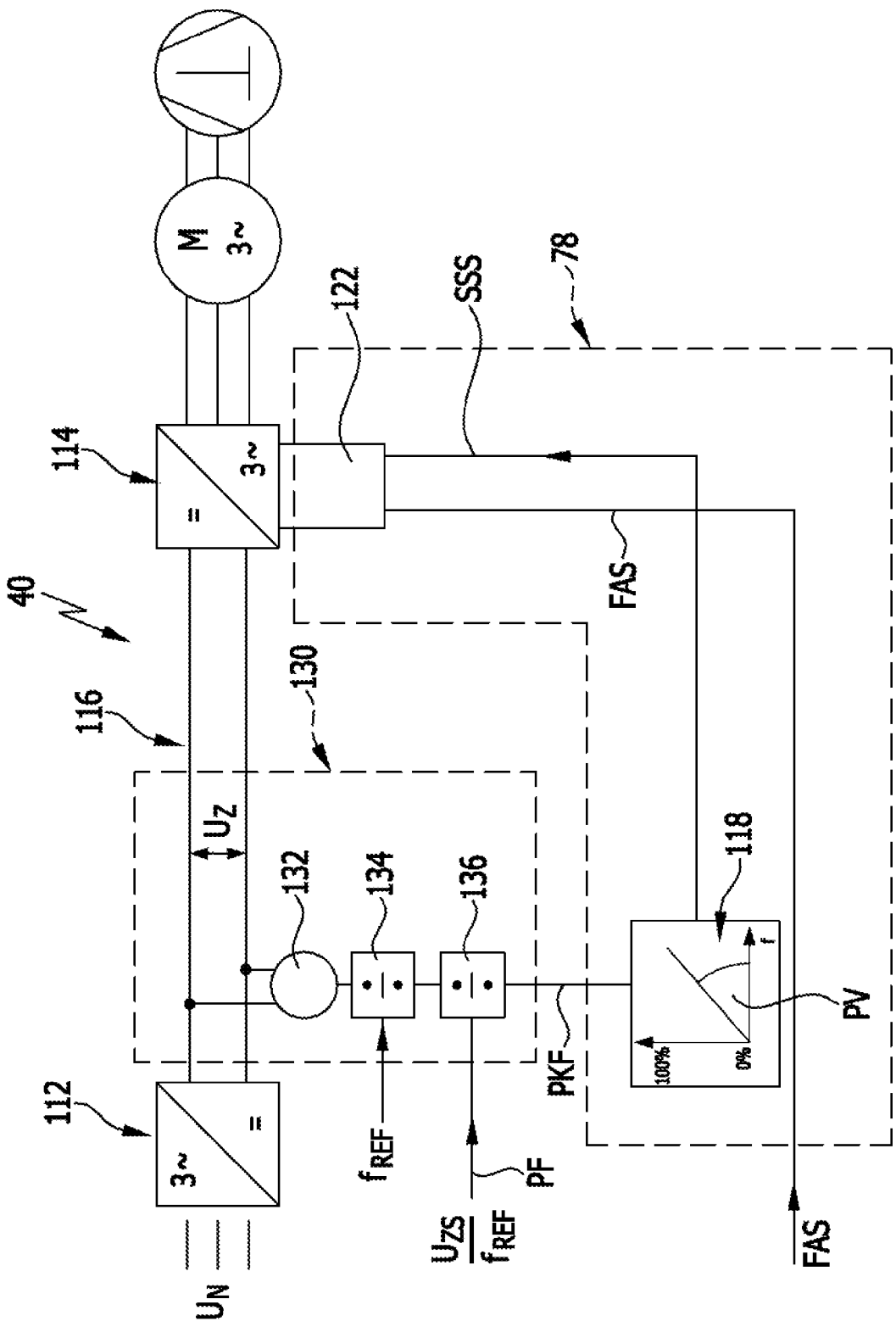
FIG. 10 shows a schematic illustration of a frequency converter having a voltage adapter unit.

A known frequency converter 40, illustrated in FIG. 10, includes a rectifier stage 112, an inverter stage 114 and a link 116 that is provided between the rectifier stage 112 and the inverter stage 114, across which the link voltage $U_Z$ is applied as a DC voltage.

Here, the link voltage $U_Z$ depends on the mains voltage $U_N$ supplied to the rectifier stage 112, and fluctuates in proportion to the mains voltage $U_N$.

Here, the inverter stage 114 of the frequency converter 40 is controlled by the frequency converter controller 78, to which the frequency request signal FAS is supplied.

Here, on the basis of the frequency request signal FAS and with the aid of a proportional member 118, the frequency converter controller 78 generates a voltage control signal SSS, which is supplied in addition to the frequency request signal FAS to an inverter stage controller 122 that, on the basis of the frequency request signal FAS and the voltage control signal SSS, which specifies for example percentage values of the maximum output voltage $U_{FUMAX}$, generates the output voltage $U_{FU}$.

For adapting to drastically fluctuating mains voltages $U_N$, there is thus associated with the frequency converter 40 a voltage adapter unit 130 that uses a voltage measuring unit 132 to measure the link voltage $U_Z$ in the link 116 and supplies this link voltage $U_Z$ to a dividing member 134, to which a reference frequency $f_{REF}$ is also supplied.

The reference frequency $f_{REF}$ is of a size such that, with a setpoint value $U_{ZS}$ of the link voltage $U_Z$, the result is the proportionality factor that is desired for the increase in output voltage $U_{FU}$ of the converter 40 over the frequency F.

The result from this dividing member 134 is supplied to a further dividing member 136 to which on the other hand there is supplied the desired proportionality factor PF for the increase in output voltage $U_{FU}$ of the frequency converter 40 over the operating frequency f, which corresponds to the link voltage setpoint value $U_{ZS}$ divided by the reference frequency $f_{REF}$.

The result from the second dividing member 136 is a proportionality correction factor PKF which is equal to one if the result from the first dividing member 134 that is supplied to this dividing member 136 corresponds to the desired proportionality factor, and is not equal to 1 if the link voltage $U_Z$ differs from the link voltage setpoint value $U_{ZS}$.

If the proportionality correction factor PKF generated by the dividing member 136 is now supplied to the proportional member 118, then it can be used to vary the proportionality behavior PV provided in the proportional member 118 between the operating frequency f of the frequency request signal FAS and the voltage control signal SSS.

Figure 11:
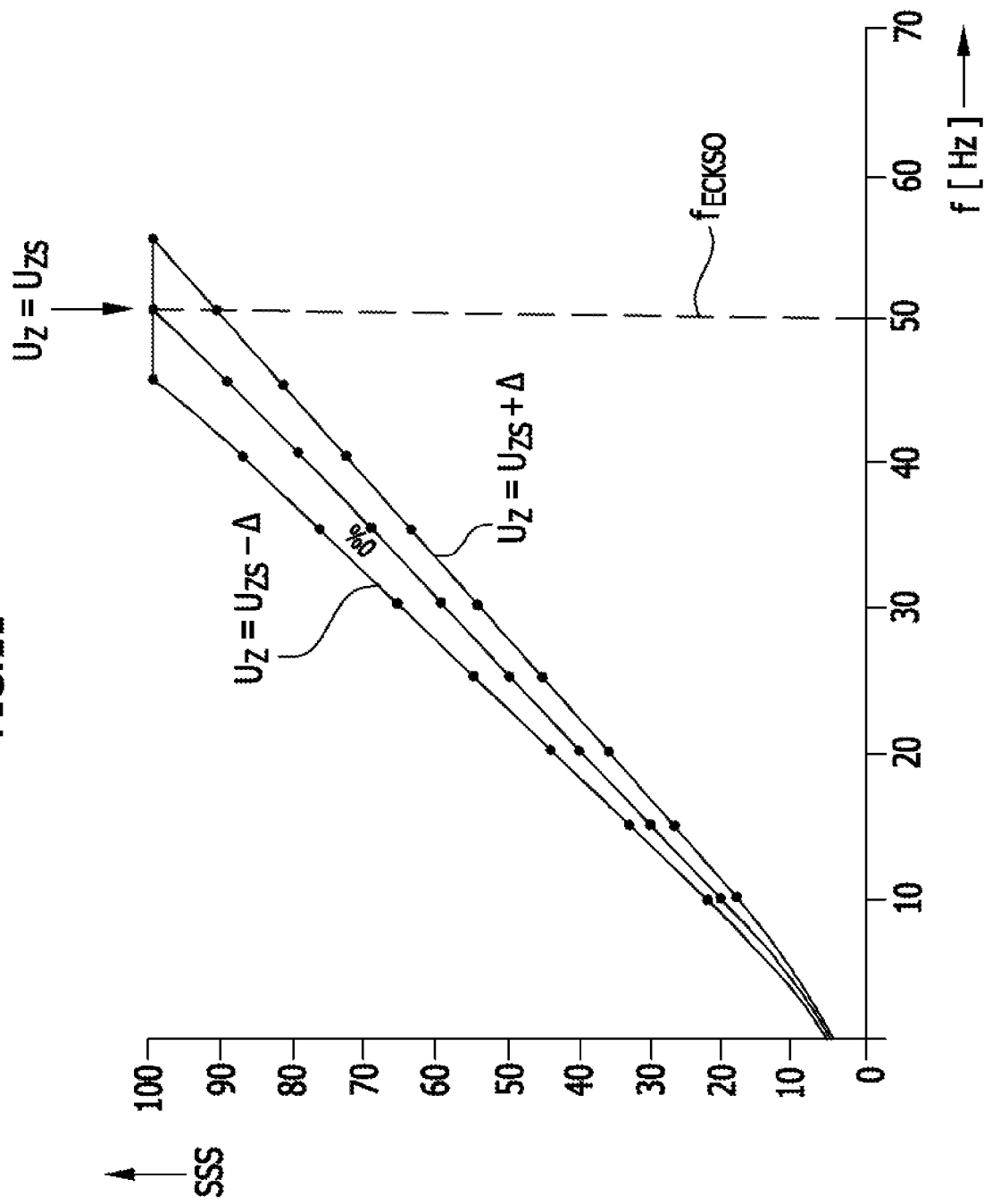
FIG. 11 shows a drawing representing a voltage control signal for the frequency converter over the operating frequency.

FIG. 11 illustrates for example how the proportionality between the operating frequency f of the frequency request signal FAS and the voltage control signal SSS varies.

Here, the function of the voltage adapter unit 130 is that, when the link voltage $U_Z$ corresponds to the link voltage setpoint value $U_{ZS}$ as illustrated in FIG. 11, the cut-off frequency corresponds to the setpoint cut-off frequency $f_{ECKSO}$, which is for example 50 hertz.

If the link voltage $U_Z$ differs from the link voltage setpoint value $U_{ZS}$ by the value Δ, for example giving smaller voltage values, then the voltage control signal SSS of 100% will reach lower operating frequencies f than the setpoint cut-off frequency $f_{ECKSO}$.

If by contrast the link voltage $U_Z$ is greater than the link voltage setpoint value $U_{ZS}$ by the value Δ, then the voltage control signal SSS of 100% will reach higher operating frequencies f than the setpoint cut-off frequency $f_{ECKSO}$.

Figure 12:
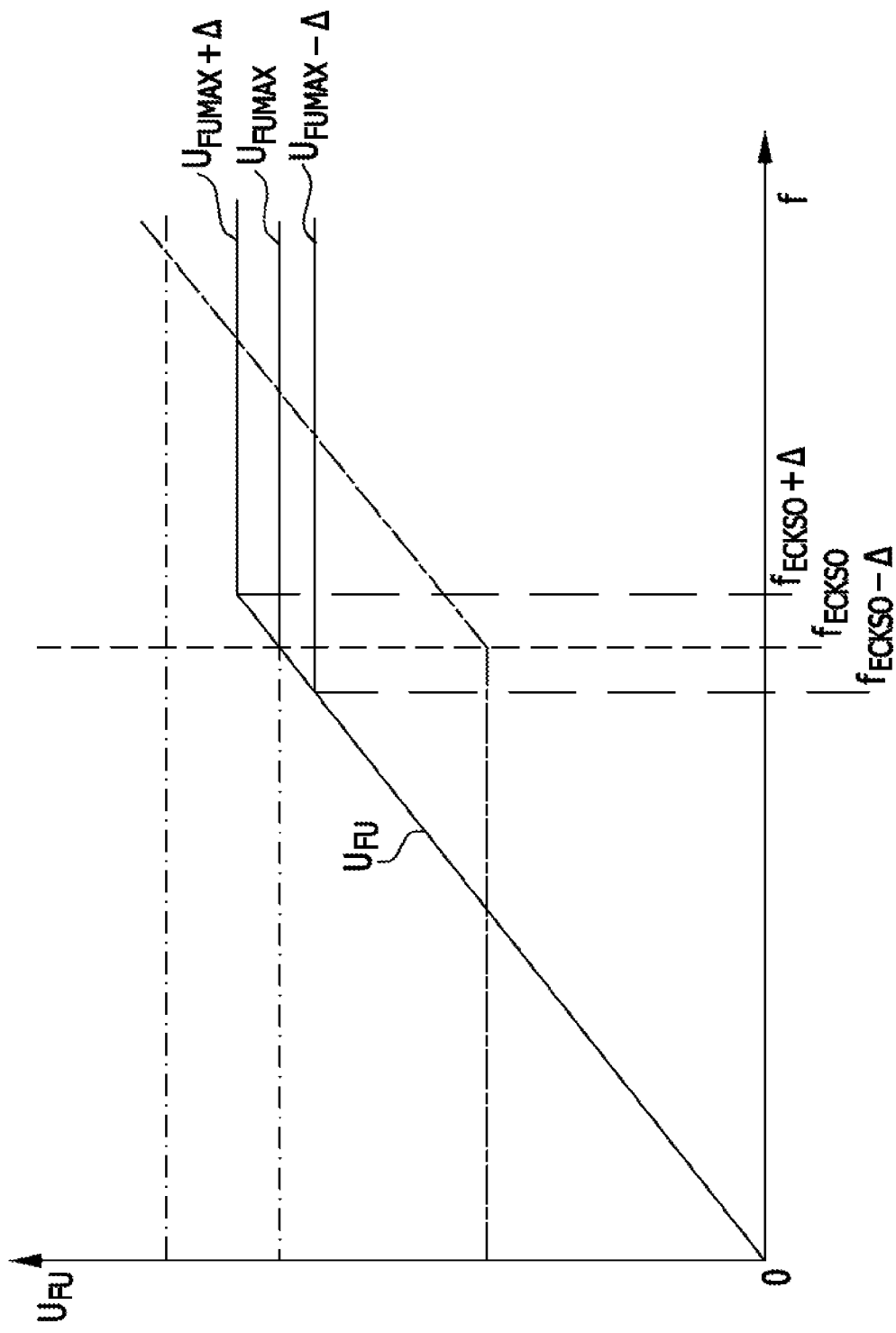
FIG. 12 shows a representation of output voltages of the frequency converter, similar to FIG. 3, in the case of a fluctuating mains voltage.

As illustrated in FIG. 12, this results in the cut-off frequency $f_{ECK}$, that is to say the frequency at which the maximum output voltage $U_{FUMAX}$ is reached at the output of the frequency converter 40, varying in particular in accordance with the deviation in the link voltage $U_Z$ from the link voltage setpoint value $U_{ZS}$, with the result that the maximum output voltage $U_{FUMAX}$ of the frequency converter 40 also varies.

The invention claimed is:

1. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein, using the working state operating current value, the frequency converter whereof the maximum converter current value is greater than or equal to the determined working state operating current value is selected from data of frequency converters available for selection.

2. The method according to claim 1, wherein the frequency converter whereof the maximum converter current value is as close as possible to the working state operating current value is selected.

3. The method according to claim 1, wherein the drive data are determined empirically.

4. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein the frequency converter is selected such that its maximum converter start-up current value is greater than or equal to a start-up current value of the refrigerant compressor unit.

5. The method according to claim 4, wherein a stored start-up current value is used for selecting the frequency converter.

6. The method according to claim 4, wherein the start-up current value is determined empirically.

7. The method according to claim 4, wherein the frequency converter is selected such that its maximum converter current value is as close as possible to the start-up current value.

8. The method according to claim 4, wherein the frequency converter is selected such that its maximum converter current value is as close as possible to the higher of the values of working state operating current value and start-up current value.

9. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein, in each working state of the refrigerant compressor unit, empirical drive data are stored for the possible operating frequencies to be selected.

10. The method according to claim 9, wherein the operating frequency that is to be selected lies in the range from 0 hertz to 140 hertz.

11. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein the drive data have the empirically determined power consumption for each working state in the application field at the different operating frequencies.

12. The method according to claim 11, wherein the working state operating current value at the selected operating frequency is calculated on the basis of the empirically determined electrical power consumption at the respective operating frequency, taking into account an equivalent circuit of the drive motor of the refrigerant compressor unit.

13. A method for selecting a frequency converter for a refrigerant compressor unit, including a refrigerant compressor and an electric time motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein, for determining the working state operating current value, the impedance of the equivalent circuit of the drive motor is taken into account.

14. The method according to claim 13, wherein, for determining the working state operating current value, the empirically determined electrical power consumption of the refrigerant compressor unit is compared with the power consumption resulting from the equivalent circuit and the slip is determined therefrom.

15. The method according to claim 13, wherein the working state operating current value is determined from the determined slip and the impedance of the equivalent circuit of the drive motor.

16. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein the empirically determined electrical power consumption of each working state in the application field is recorded, in particular stored, at the respective operating frequency.

17. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein the working state operating current values calculated from the empirically determined electrical power consumption are recorded, in particular stored, for each working state and each operating frequency.

18. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein the working state operating current value for each working state and each operating frequency is determined empirically and recorded, in particular stored.

19. A method for selecting a frequency converter for a refrigerant compressor unit, including a refrigerant compressor and an electric time motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein the working states in the application field that are associated with the maximum converter current value are determined on the basis of this maximum converter current value of the selected frequency converter at a selected operating frequency using the drive data.

20. The method according to claim 19, wherein the working states determined for the maximum converter current value are displayed in the application graph.

21. A method for selecting a frequency converter for a refrigerant compressor unit, including a refrigerant compressor and an electric drive motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein only frequency converters that include a frequency limiting unit are selected, wherein, at operating frequencies above a cut-off frequency, the frequency limiting unit limits the operating frequency such that the maximum converter current value of the frequency converter is not exceeded.

22. The method according to claim 21, wherein the working state operating current value of the frequency converter is continuously detected by the frequency limiting unit.

23. The method according to claim 21, wherein the working state operating current value of the frequency converter is compared with a current reference value and the operating frequency is limited to a limit frequency that applies when the current reference value is reached.

24. The method according to claim 23, wherein the frequency limiting unit takes into account as the current reference value both the maximum converter current value and the maximum compressor operating current value, and determines the limit frequency on the basis of the lowest of the maximum current values.

25. A method for selecting a frequency converter for a refrigerant compressor unit, including a refrigerant compressor and an electric time motor, a working state suitable for operation of the refrigerant compressor unit is selected within an application field of an application graph of the refrigerant compressor, an operating frequency for this selected working state is selected, and a working state operating current value that corresponds to the selected working state and the selected operating frequency is determined from drive data, for operation of the refrigerant compressor unit, wherein only a frequency converter in which a voltage adapter unit brings about an increase in the output voltage over the operating frequency independently of a fluctuation in a mains voltage is made available for selection.

26. The method according to claim 25, wherein a link voltage of the frequency converter is measured and, as a result of a comparison with at least one reference value, a voltage curve of the output voltage is corrected.

\* \* \* \* \*

UNITED STATES PATENT AND TRADEMARK OFFICE
CERTIFICATE OF CORRECTION

PATENT NO. : 10,804,834 B2
APPLICATION NO. : 16/168108
DATED : October 13, 2020
INVENTOR(S) : John Gibson et al.

Page 1 of 1

It is certified that error appears in the above-identified patent and that said Letters Patent is hereby corrected as shown below:

In the Claims

Column 16, Claim 13, Line 61 currently reads "an electric time motor" and should correctly read --an electric drive motor--

Column 17, Claim 19, Line 59 currently reads "an electric time motor" and should correctly read --an electric drive motor--

Column 18, Claim 25, Line 45 currently reads "an electric time motor" and should correctly read --an electric drive motor--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*